US010625351B2

(12) United States Patent
Zankl et al.

(10) Patent No.: US 10,625,351 B2
(45) Date of Patent: Apr. 21, 2020

(54) MILLING TOOL

(71) Applicant: Hartmetall-Werkzeugfabrik Paul Horn GmbH, Tuebingen (DE)

(72) Inventors: Max Zankl, Egenhofen (DE); Johannes Hoss, Ofterdingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 0 days.

(21) Appl. No.: 16/037,188

(22) Filed: Jul. 17, 2018

(65) Prior Publication Data

US 2018/0318940 A1 Nov. 8, 2018

Related U.S. Application Data

(63) Continuation of application No. PCT/EP2017/051193, filed on Jan. 20, 2017.

(30) Foreign Application Priority Data

Jan. 22, 2016 (DE) ........................ 10 2016 101 145

(51) Int. Cl.
*B23C 5/08* (2006.01)
*B23C 5/22* (2006.01)
(Continued)

(52) U.S. Cl.
CPC .............. *B23C 5/006* (2013.01); *B23C 5/207* (2013.01); *B23F 21/128* (2013.01)

(58) Field of Classification Search
CPC ........... B23C 5/006; B23C 5/207; B23C 5/08; B23C 5/22; B23F 21/128; B23F 21/146
See application file for complete search history.

(56) References Cited

U.S. PATENT DOCUMENTS 1,899,023 A 2/1933 Earl
4,047,670 A * 9/1977 Svensson .............. B02C 18/143 241/92
(Continued)

FOREIGN PATENT DOCUMENTS

CN 201309021 Y 9/2009
CN 103180078 A 6/2013
(Continued)

OTHER PUBLICATIONS

International Search Report (including translation) for International Application No. PCT/EP2017/051193, dated Apr. 11, 2017.
(Continued)

*Primary Examiner* — Sara Addisu
(74) *Attorney, Agent, or Firm* — Jason H. Vick; Sheridan Ross, PC (57) ABSTRACT

A milling tool for cyclo-palloid toothing has a holder and multiple first cutting plates. and includes a clamping portion for clamping the holder and a holder head, which projects radially compared to the clamping portion in the front end and on which there are multiple first cutting plate receptacles. The first cutting plates are fastened in the first cutting plate receptacles, and project radially outward, wherein the radially outermost points of the first cutting plates lie in each case on a common circle, the center point of which lies on the center axis of the holder. The first cutting plates are arranged at an angle to an orthogonal plane which is orthogonal to the holder center axis. Multiple first partly conical surfaces are provided on a top side of the holder head. Multiple second partly conical surfaces are provided on an end side of the holder head.

13 Claims, 7 Drawing Sheets

(51) Int. Cl.
  *B23F 21/14* (2006.01)
  *B23F 21/10* (2006.01)
  *B23C 5/00* (2006.01)
  *B23F 21/12* (2006.01)
  *B23C 5/20* (2006.01)

(56) References Cited

U.S. PATENT DOCUMENTS

| | | | |
|---|---|---|---|
| 4,997,018 A * | 3/1991 | Carpenter | B27L 11/005 |
| | | | 144/176 |
| 8,317,433 B2 | 11/2012 | Durr | |
| 8,550,753 B2 | 10/2013 | Sjoo | |
| 8,961,075 B2 * | 2/2015 | Sagstrom | B23F 21/128 |
| | | | 407/30 |
| 9,352,406 B2 | 5/2016 | Scherbarth | |
| 9,981,330 B2 * | 5/2018 | Sjoo | B23F 21/106 |
| 10,099,300 B2 * | 10/2018 | Stadtfeld | B23F 21/106 |
| 2008/0206007 A1 | 8/2008 | Hughes | |
| 2010/0196107 A1 | 8/2010 | Ribbeck et al. | |
| 2011/0255925 A1 | 10/2011 | Yoshida | |
| 2011/0311327 A1 * | 12/2011 | Harif | B23C 5/109 |
| | | | 407/42 |
| 2013/0322974 A1 | 12/2013 | Scherbarth | |
| 2015/0183032 A1 | 7/2015 | Stark | |

FOREIGN PATENT DOCUMENTS

| | | |
|---|---|---|
| CN | 103381500 A | 11/2013 |
| CN | 204277051 U | 4/2015 |
| DE | 202007007063 U1 | 10/2007 |
| DE | 202009009138 U1 | 9/2009 |
| DE | 102012108752 B3 | 1/2014 |
| EP | 2659999 A2 | 11/2013 |
| JP | 2010-105155 A | 5/2010 |
| JP | 2011-126007 A | 6/2011 |
| JP | 2013-202767 | 10/2013 |
| JP | 2013-233646 A | 11/2013 |
| JP | 2013-543450 A | 12/2013 |
| JP | 2016-529128 A | 9/2016 |
| RU | 2318634 C2 | 3/2008 |
| SU | 1547978 | 3/1990 |
| WO | WO 2010/073681 | 7/2010 |
| WO | WO 2012/052367 | 4/2012 |
| WO | WO 2015/034699 | 3/2015 |

OTHER PUBLICATIONS

Written Opinion for International Application No. PCT/EP2017/051193, dated Apr. 11, 2017.

International Preliminary Report on Patentability for International Application No. PCT/EP2017/051193, dated Aug. 2, 2018.

Office Action for corresponding Chinese Patent Application No. 201780007506.7, dated May 5, 2019.

Decision to Grant a Patent for an Invention for corresponding Russian Application No. 2018129100/02 (046785), dated Jun. 10, 2019.

Notification of Reason for Refusal (Including Translation) for corresponding Japanese Patent Application No. 2018-538549, dated Oct. 1, 2019.

* cited by examiner

MILLING TOOL

CROSS REFERENCES TO RELATED APPLICATIONS

This application is a continuation of international patent application PCT/EP2017/051193, filed on Jan. 20, 2017 designating the U.S., which international patent application has been published in German language and claims priority from German patent application DE 10 2016 101 145.2, filed on Jan. 22, 2016. The entire contents of these priority applications are incorporated herein by reference.

BACKGROUND OF THE INVENTION

This disclosure relates to a milling tool for machining a workpiece. The disclosure relates, in particular, to a milling tool which is suitable for producing a cyclo-palloid toothing.

Cyclo-palloid toothings are frequently also designated as Klingelnberg cyclo-palloid toothings. Such toothings can be found in the majority of cases on bevel gears or other gearing parts. Compared to bevel gears with "regular", straight toothings, bevel gears with cyclo-palloid toothings are distinguished by their greater smoothness, better acoustics, higher load capacity and better utilization of the installation space.

The tooth shape of a cyclo-palloid toothing corresponds to the portion of a spiral. The teeth consequently each comprise a convex and a concave flank, the width of each tooth widening along the tooth comb. The one end-face end of each tooth is therefore narrower than the other end-face end of the same tooth on account of the spiral-shaped widening.

Due to the geometry, the production of such cyclo-palloid toothings is more complex and consequently in most cases more expensive when compared to "regular" toothings with straight flanks. Cyclo-palloid toothings are usually produced by means of gear-cutting machines which are set up especially for this purpose. On account of the high purchase costs of such gear-cutting machines, however, increasingly there is the desire to produce such geometrically complex toothings also by means of universal milling machines. This is of interest in particular to producers that produce these types of bevel gears, also called hypoid bevel gears or spiral bevel gears, in small batches as for such producers the purchase of an extra gear-cutting machine is not really profitable.

There are already approaches for the construction of special milling tools by means of which abovementioned toothings can be produced on CNC milling machines with five-axis technology. The results obtained with the previously known solutions of such special milling tools have up to now been rather modest from a qualitative and economic view point. This is in particular due to the relatively long machining time which comes about as a result of a relatively high number of machining steps being necessary with the previous milling tools in order to mill the tooth profile to be produced on the workpiece to the full depth thereof. On account of the relatively complex geometry of the toothing, it has not been possible, up to now, to mill at least parts of the toothing profile directly to the full profile depth in one operation as the plunge depth is restricted on account of the geometry in order to avoid collisions between tool holder and workpiece. In addition, frequently more than only one tool is also necessary in order to produce the tooth profile of a cyclo-palloid toothing by means of milling.

SUMMARY OF THE DISCLOSURE

It is thus an object to provide a milling tool for machining a workpiece which is suitable, in particular, for producing a cyclo-palloid toothing and, at the same time, is improved in particular compared to the previously disclosed solutions with reference to the efficiency of the tool.

According to an aspect, a milling tool is herein presented which comprises:

a holder which is rotated about a center axis when the milling tool is used, wherein the holder comprises in a region of its rear end a clamping portion for clamping the holder and comprises in a region of its rear end a holder head which projects out radially compared to the clamping portion, wherein the holder head comprises multiple first, second and third cutting plate receptacles, which are arranged distributed in a circumferential direction of the holder, wherein each of the second cutting plate receptacles is arranged between one of the first cutting plate receptacles and one of the third cutting plate receptacles, multiple first cutting plates, each of which are fastened in one of the first cutting plate receptacles, wherein the first cutting plates project radially outward beyond the holder head, wherein radially outermost points of the first cutting plates lie on a common circle, wherein a center point of said common circle lies on the center axis of the holder, multiple second cutting plates, each of which are fastened in one of the second cutting plate receptacles, wherein the second cutting plates differ from the first cutting plates, multiple third cutting plates, each of which are fastened in one of the third cutting plate receptacles, wherein the third cutting plates differ from the first cutting plates, wherein multiple first partly conical surfaces, which lie on a common, imaginary first envelope cone, are provided on a top side of the holder head, said top side facing the clamping portion, wherein an imaginary tip of the imaginary first envelope cone lies on the center axis of the holder and a surface line of the imaginary first envelope cone encloses a first angle $\alpha_1$ with an orthogonal plane, which is aligned orthogonally to the center axis of the holder, wherein multiple second partly conical surfaces, which lie on a common, imaginary second envelope cone, are provided on an end side of the holder head, said end side being remote from the clamping portion and arranged opposite the top side, wherein an imaginary tip of the imaginary second envelope cone lies on the center axis of the holder and a surface line of the imaginary second envelope cone encloses a second angle $\alpha_2$ with the orthogonal plane, wherein each of the first cutting plate receptacles has a first bearing surface, wherein each of the first cutting plates abuts against one of the first bearing surfaces, wherein the first bearing surfaces are arranged between the top side and the end side of the holder head and each enclose a third angle $\alpha_3$ with the orthogonal plane, wherein the surface line of the imaginary first envelope cone encloses a fourth angle $\alpha_4$ with the surface line of the imaginary second envelope cone, and wherein the following applies: (i) $\alpha_1 > \alpha_3 \geq \alpha_2$ and (ii) $\alpha_4 \leq \alpha_1$.

Thus, multiple first partly conical surfaces are provided on the top side of the holder head and multiple second partly conical surfaces are provided on the oppositely situated bottom or end side of the holder head. The multiple first partly conical surfaces provided on the top side of the holder head lie on a common, imaginary first envelope cone which is rotationally symmetrical to the center axis of the holder.

The second partly conical surfaces which are arranged on the end side of the holder head lie on a common, imaginary second envelope cone which is also rotationally symmetrical to the center axis of the holder. It is noticed in this case that the imaginary envelope cones, but not necessarily the partly conical surfaces themselves, are rotationally symmetrical to the center axis of the holder.

The angle which the surface line of the first envelope cone encloses with an orthogonal plane aligned orthogonally to the center axis of the holder (in the present case designated as angle $\alpha_1$) is realized greater than the angle which the surface line of the second envelope cone encloses with the orthogonal plane (in the present case designated as angle $\alpha_2$). The angle which the surface lines of the two envelope cones enclose with one another (in the present case designated as angle $\alpha_4$) is, however, smaller than the angle $\alpha_1$.

A further characteristic of the milling tool lies in the "tilted" arrangement of the first cutting plates on the holder or holder head. The first bearing surfaces, against which the first cutting plates on the holder abut, are also inclined at an angle to the orthogonal plane. Said angle is designated in the present case as third angle $\alpha_3$, wherein the following applies $\alpha_1 > \alpha_3 \geq \alpha_2$. The angle of inclination of the first bearing surfaces is therefore chosen such that it is smaller in amount than the first angle $\alpha_1$ (angle between the surface line of the first envelope cone and the orthogonal plane), but greater than or of same size as the second angle $\alpha_2$ (angle between the surface line of the second envelope cone and the orthogonal plane).

The named geometric ratios result in the first cutting plates being able to project radially outward at some distance beyond the holder head without unwanted collisions occurring between the holder head and the workpiece during operation. This is due, among other things, to the form of the tool head being adapted at least in part to the toothing contour to be produced on the workpiece. As already mentioned, each tooth of a cyclo-palloid toothing has a convex and a concave flank. The first and second part-cone surfaces provided on the holder head imitate said form somewhat. The angled arrangement of the first cutting plates also has a positive effect in this respect.

The wide, radial projection of the first cutting plates makes it possible, in turn, to mill the toothing profile to the entire profile depth (tooth height) as early as in the first machining operation. This, in turn, results in an enormous time saving and consequently also in increased efficiency of the milling tool.

The milling tool may be used in universal milling machines, for example in five-axis machining centers.

According to a refinement, the difference between the third angle $\alpha_3$ (angle between first bearing surface and orthogonal plane) and the second angle $\alpha_2$ (angle between surface line of the second envelope cone and the orthogonal plane) is less than 6°. It is namely preferred in particular for the main cutting edges of the first cutting plates to run at least approximately parallel to the surface lines of the first or second envelope cone. For production reasons, the third angle $\alpha_3$ should consequently not be very different to the second angle $\alpha_2$ as otherwise it could result in increased grinding expense of the cutting edges of the first cutting plates.

According to a further refinement, the third angle $\alpha_3$ is of same size as the second angle $\alpha_2$. The first bearing surfaces of the first cutting plates are consequently inclined at the same angle with reference to the orthogonal plane as the surface line of the second envelope cone of the second part-cone surfaces arranged on the underside or end side.

According to a further refinement, each of the first cutting plates comprises a first main cutting edge and a second main cutting edge, which enclose a fifth angle $\alpha_5$ between each other, wherein the following applies: $\alpha_5 \geq \alpha_4$. When the angle $\alpha_5$ between the two main cutting edges of the first cutting plates is greater than the angle $\alpha_4$ between the surface line of the first envelope cone and the surface line of the second envelope cone, it ensures that the holder head runs freely even when deeper toothing profiles are machined.

According to a further refinement, the fifth angle $\alpha_5$ is of same size as the fourth angle $\alpha_4$. This is particularly preferred from a geometric viewpoint as each first main cutting edge of the first cutting plates runs parallel in this case to the surface line of the first envelope cone and each second main cutting edge of the first cutting plates runs parallel to the surface line of the second envelope cone. In other words, the first main cutting edges therefore run parallel to the first part-cone surfaces provided on the top side of the holder head and the second main cutting edges run parallel to the second part-cone surfaces provided on the underside or end side of the holder head.

According to a further refinement, each of the first cutting edges encloses a sixth angle $\alpha_6$ with the orthogonal plane which is of same size as the first angle $\alpha_1$, and for the second main cutting edges to enclose a seventh angle $\alpha_7$ with the orthogonal plane which is of same size as the second angle $\alpha_2$.

In a further refinement, multiple second and third cutting plate receptacles, which are arranged distributed in the circumferential direction, are further provided on the holder, wherein a second cutting plate is fastened in each of the second cutting plate receptacles, and a third cutting plate is fastened in each of the third cutting plate receptacles, wherein the second cutting plate receptacles, when viewed in the circumferential direction of the holder, are each arranged between a first cutting plate receptacles and a third cutting plate receptacles, and wherein the second and third cutting plates differ from the first cutting plates.

In the last-named refinement, the same number of first cutting plates may be provided as second and third cutting plates. For example, three first cutting plates, three second cutting plates and three third cutting plates can be provided. It is also possible to provide in each case two, four or five of the first, second and third cutting plates. This depends, on the one hand, on the size of the milling head and of the toothing profile to be achieved. On the other hand, it depends on the results of the machining process.

Irrespective of the number of first, second and third cutting plates provided in each case, they are preferably arranged in groups of three on the holder. This means that, when viewed in the circumferential direction, they are each arranged alternately, in each case a second cutting plate is arranged on the holder between a first and a third cutting plate and a third cutting plate is arranged between a second cutting plate and a first cutting plate. Correspondingly, when viewed in the circumferential direction, a first cutting plate is arranged in each case between a third and a second cutting plate.

The terms "first", "second", "third" cutting plate are herein only to differentiate the various types of cutting plates. It is, however, not meant to imply a number or a structural meaning going beyond this.

In the last-named refinement, it is preferred when the second cutting plates are realized geometrically mirror-inverted compared to the third cutting plates. In this case, this is then referred to as a left and a right cutting plate.

In addition, it is preferred for the first and the second cutting plates to be screw-connected to the holder from the end side of the holder head, and the third cutting plates to be screw-connected to the holder from the top side of the holder head. The third cutting plates are therefore consequently accessible from the top side of the holder head, whereas the first and second cutting plates are accessible from the underside or end side of the holder head. In this case, preferably just the first cutting plates project radially outward from the holder head.

The first cutting plates assume the function of machining the profile bottom and the lower parts of the tooth flanks adjoining the profile bottom during the machining. The second and third cutting plates, in contrast, machine the upper parts of the tooth flanks. Whereas the first cutting plates are used both when machining the convex and when machining the concave flanks, the second cutting plates are only used for machining the convex tooth flanks and the third cutting plates only for machining the concave tooth flanks. It is obvious that initially all three cutting plate types engage with the work-piece in the first cut into the work-piece.

In a further refinement, each of the second cutting plates comprises a third main cutting edge which encloses an eighth angle $\alpha_8$ with the orthogonal plane which is of same size as the second angle $\alpha_2$, and that each of the third cutting plates comprises a fourth main cutting edge which encloses a ninth angle $\alpha_9$ with the orthogonal plane which is of same size as the first angle $\alpha_1$. In this case, it is particularly preferred for the eighth angle $\alpha_8$ to be of same size as the seventh angle $\alpha_7$, and for the ninth angle $\alpha_9$ to be of same size as the sixth angle $\alpha_6$.

The fourth main cutting edges of the third cutting plates may be aligned precisely parallel to the first main cutting edges of the first cutting plates. In the same way, the third main cutting edges of the second cutting plates may be aligned parallel to the second cutting edges of the first cutting plates. The fourth main cutting edges of the third cutting plates may be moved during the rotation of the tool about the center axis on a common envelope cone on which the first main cutting edges of the first cutting plates are moved during the rotation of the tool. The third main cutting edges of the second cutting plate may be moved in the same way during the rotation of the tool about the center axis on the same envelope cone on which the second main cutting edges of the first cutting plates are moved during the rotation of the tool.

According to a further refinement, the first cutting plates are fastened to the holder by means of a screw, wherein each of the screws engages in a thread, wherein the threads are each provided in the holder head orthogonally to the first bearing surfaces.

In a further refinement, the holder may be produced at least in part from steel and the first cutting plates may be produced at least in part from hard metal. The second and third cutting plates may also be produced at least in part from hard metal. The first, second and third cutting plates may be fastened individually on the holder by means of screws.

The above-mentioned features and those yet to be explained in the following text are usable not only in the combination given in each case but also in other combinations or on their own, without departing from the spirit and scope of the present disclosure.

DESCRIPTION OF PREFERRED EMBODIMENTS

Figure 1:
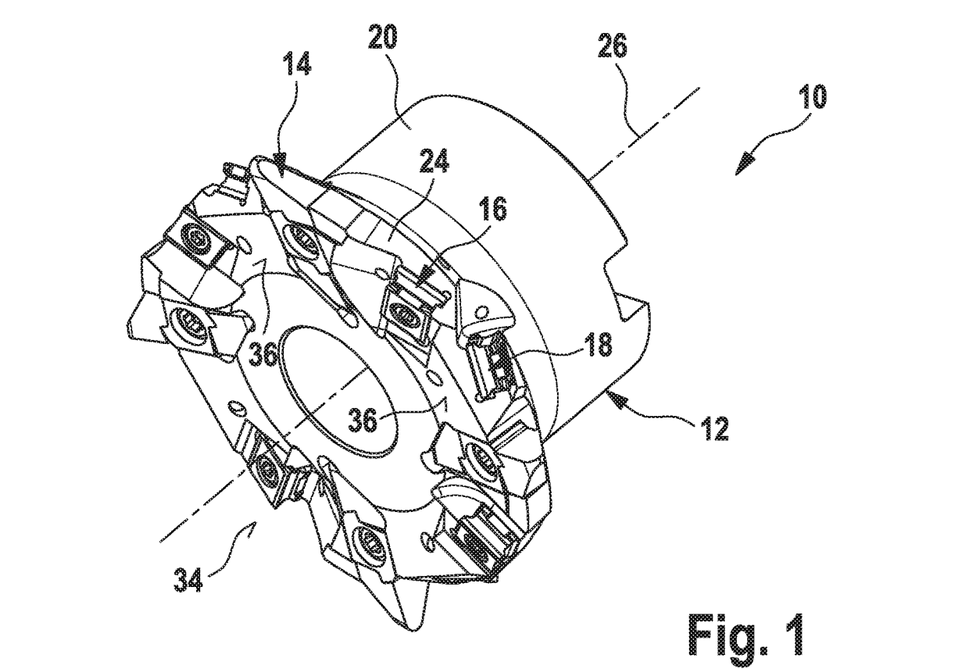
FIG. 1 shows an oblique bottom view in perspective of an exemplary embodiment of the milling tool.
Figure 2:
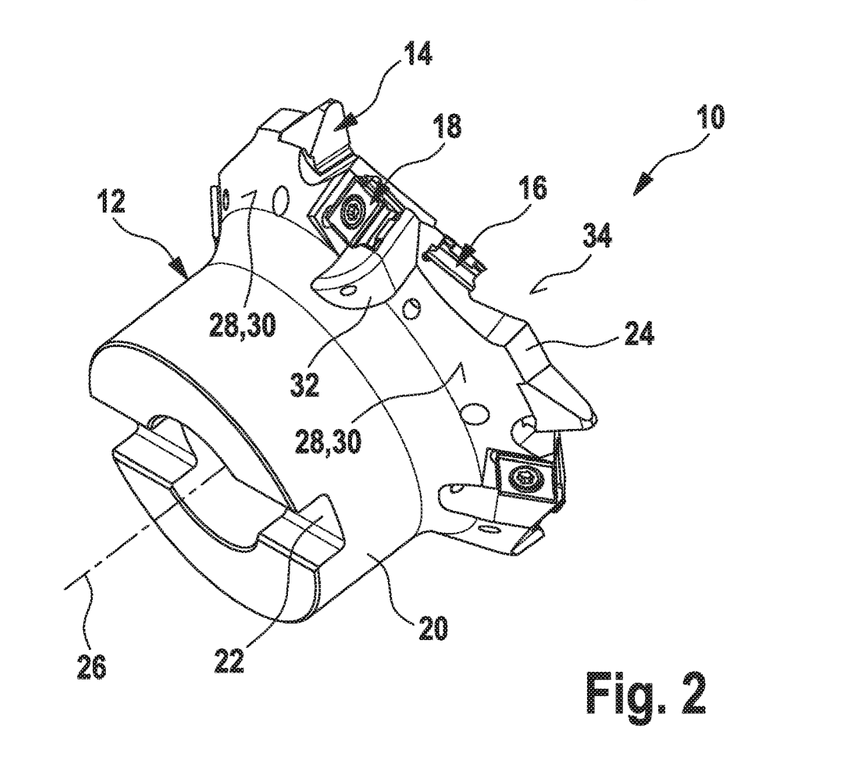
FIG. 2 shows an oblique top view in perspective of the exemplary embodiment of the milling tool shown in FIG. 1.
Figure 3:
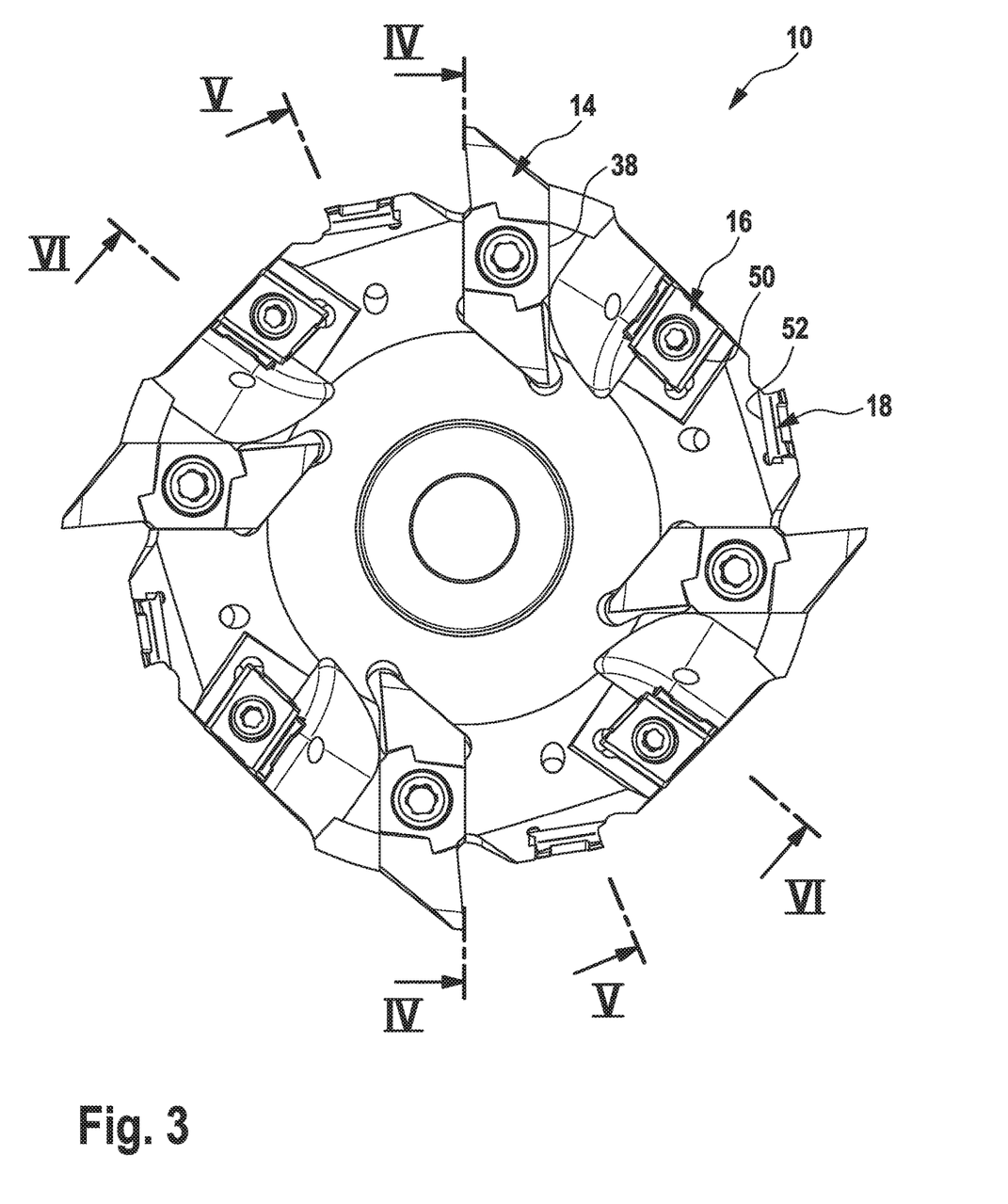
FIG. 3 shows a top view from below of the exemplary embodiment of the milling tool shown in FIG. 1.

FIG. 1-3 show an oblique bottom view in perspective, an oblique top view in perspective and a top view from below of an exemplary embodiment of the milling tool. The milling tool is designated therein as a whole by way of the reference numeral 10.

The milling tool comprises a holder 12 as well as multiple cutting plates 14, 16, 18 fastened thereon.

The holder 12 comprises a clamping portion 20 in the region of its rear end, by means of which the holder 12 can be clamped on a power tool or an extension shaft. The clamping portion 20 is usually substantially cylindrical in form and has a tool interface 22 on the end face. On the opposite front end of the holder 12, the holder 12 comprises a holder head 24 which projects radially compared to the clamping portion 20.

During the machining, the milling tool 10 is rotated about its center axis 26. During said rotation, the cutting plates 14, 16, 18 engage the workpiece one after another in order to machine it.

In the case of the exemplary embodiment shown in FIGS. 1-3, the milling tool 10 comprises three variously designed cutting plates 14, 16, 18 which are fastened on the holder head 24 in cutting plate receptacles which are correspondingly provided for this purpose. The cutting plates 14, 16, 18 are preferably indexable inserts produced from hard metal.

It is noted, however, that according to the invention just the first cutting plates 14 are obligatory, whereas the second cutting plates 16 and the cutting plates 18 are usable as an option. In principle, an exemplary embodiment would consequently also be possible where just multiple first cutting plates 14 were used. It is obvious that in this case the cutting plate receptacles for the second and third cutting plates would be omitted.

It is also noted that the milling tool 10 is not restricted to the number of cutting plates 14, 16, 18 shown in FIGS. 1-3 (here four per cutting plate type). In principle, it would also be conceivable for the milling tool 10 to be provided with 2, 3, 5 or more cutting plates per cutting plate type when maintaining the inventive principle put forward below.

Essential features of the milling tool 10 according to the invention relate to the form of the holder head 24 and to the "tilted" arrangement of the first cutting plates 14 on the holder head 24.

The holder head 24 comprises on its top side 28 facing the clamping portion 20 multiple first part-cone surfaces 30 which lie on a common imaginary envelope cone which is designated in the present case as a first envelope cone. As can be seen, in particular, in FIG. 2, said first part-cone surfaces 30 are substantially separated from one another by recesses 32 and cutting insert receptacles for the third cutting plates 18. However, they all lie, as already mentioned, on a common envelope cone and are consequently designated as part-cone surfaces.

In a similar manner, the holder head 24 also comprises on its underside or end side 34 multiple partly conical surfaces 36 which are arranged distributed in the circumferential direction and in the present case are designated as second partly conical surfaces. Said second partly conical surfaces 36 also all lie on a common, imaginary envelope cone which is designated in the present case as a second envelope cone. An imaginary tip of the first envelope cone lies on the center axis of the holder 12 in the same way as the imaginary tip of the second envelope cone.

Figure 4:
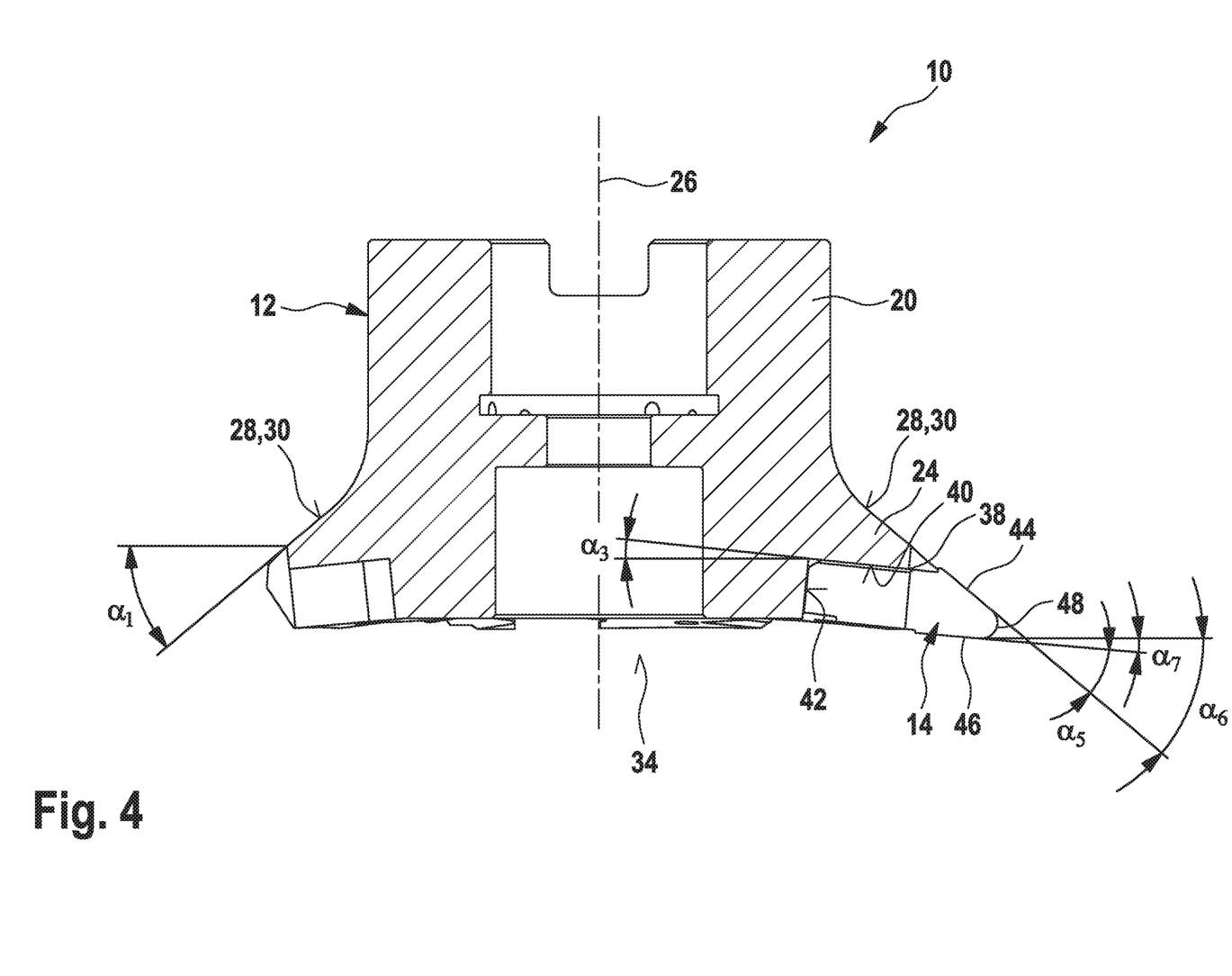
FIG. 4 shows a first sectioned view of the exemplary embodiment of the milling tool shown in FIGS. 1-3.
Figure 5:
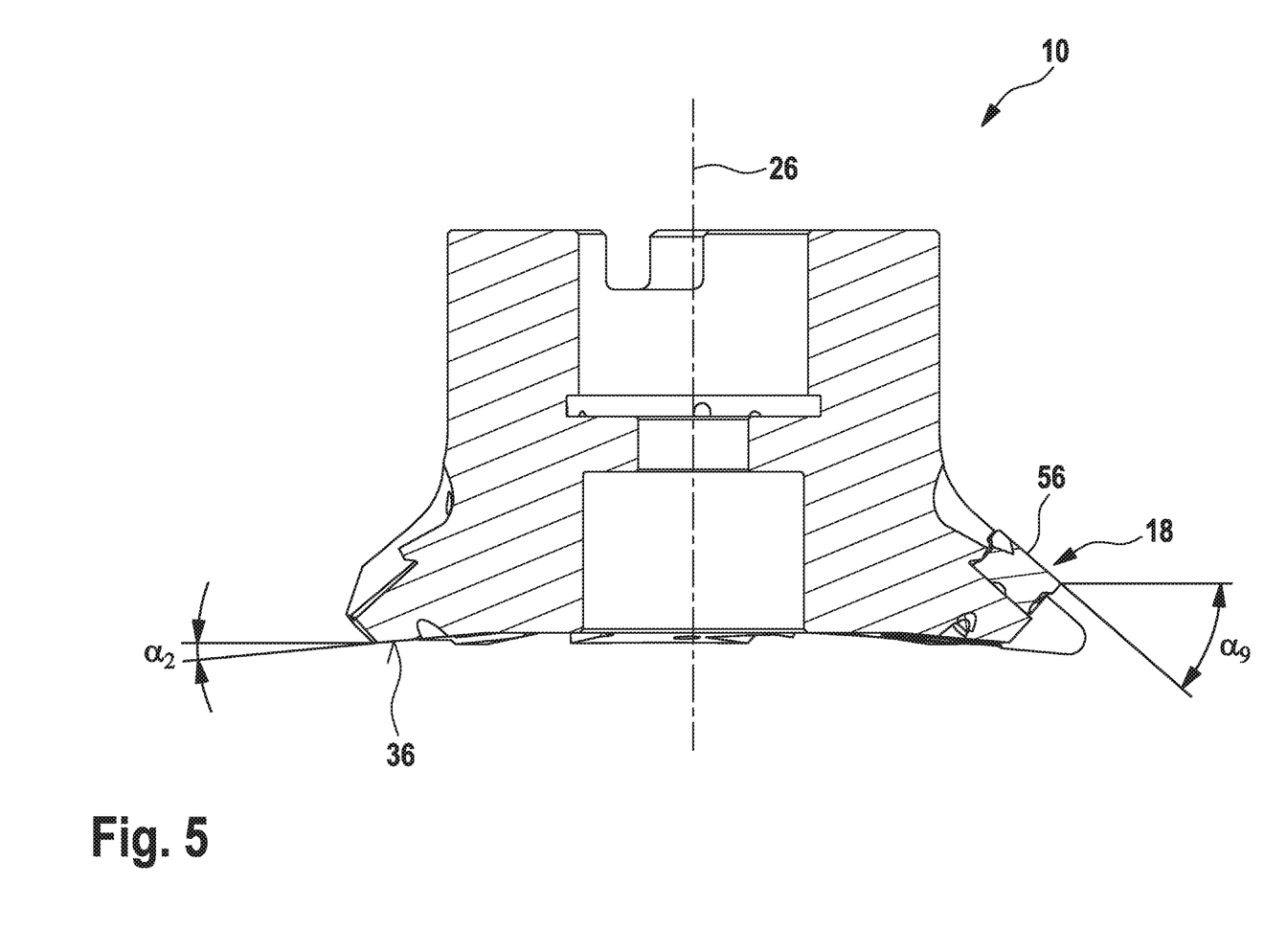
FIG. 5 shows a second sectioned view of the exemplary embodiment of the milling tool shown in FIGS. 1-3.
Figure 6:
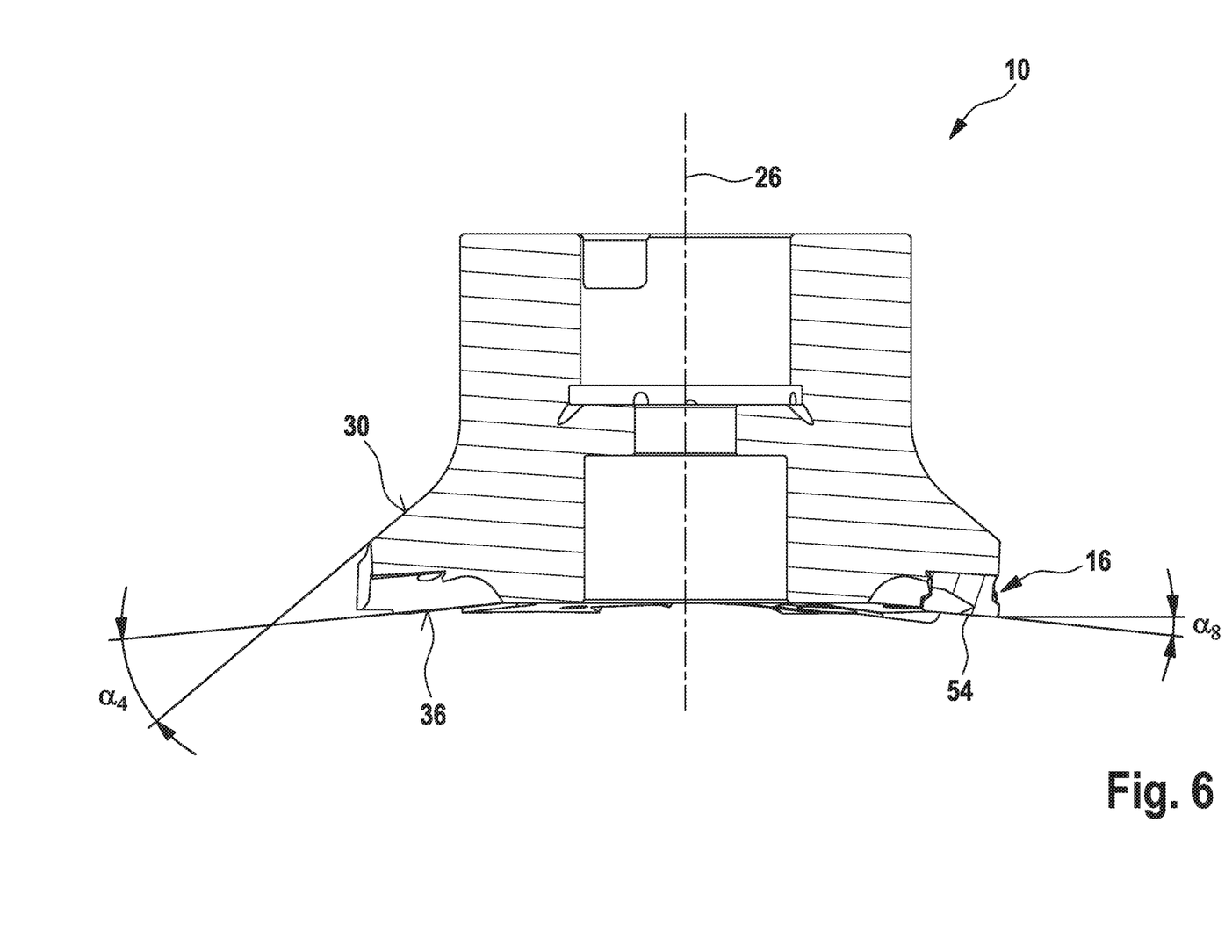
FIG. 6 shows a third sectioned view of the exemplary embodiment of the milling tool shown in FIGS. 1-3.

FIGS. 4-6 show multiple sectioned views of the exemplary embodiment of the milling tool 10 shown in FIGS. 1-3. FIG. 4 shows the section IV indicated in FIG. 3. FIG. 5 shows the section V indicated in FIG. 3. FIG. 6 shows the section VI indicated in FIG. 3.

The sectioned views shown in FIGS. 4-6 show multiples angles $\alpha_1$-$\alpha_9$ in order to illustrate the geometric position in space of the individual elements on the holder 12 and on the cutting plates 14, 16, 18.

The first angle $\alpha_1$ (see FIG. 4) designates the angle between the surface line of the first envelope cone (of the first partly conical surfaces 30) and an orthogonal plane which is aligned orthogonally to the center axis 26 of the holder 12.

The second angle $\alpha_2$ (see FIG. 5) designates the angle between the surface line of the second envelope cone (of the second partly conical surfaces 36) and the orthogonal plane.

The third angle $\alpha_3$ (see FIG. 4) designates the angle about which the first cutting plates 14 are inclined in their supports on the holder 12 in relation to the orthogonal plane. The first cutting plates 14 are each arranged in receptacles 38 on the holder 12 which are designated in the present case as first cutting plate receptacles 38. Said first cutting plate receptacles 38 each comprise a first bearing surface 40 and a second bearing surface 42. The angle $\alpha_3$ therefore designates the angle between the first bearing surfaces 40 and the orthogonal plane (see FIG. 4).

A thread, which is provided in the holder head 24 orthogonally to the first bearing surfaces 40, is preferably provided in each first cutting plate receptacles 38 for fastening the first cutting plates 14 on the holder 12. The first cutting plates 14 can consequently be fastened by means of screws which engage in said thread.

The fourth angle $\alpha_4$ (see FIG. 6) designates the angle between the surface line of the first envelope cone (of the first partly conical surfaces 30) and the surface line of the second envelope cone (of the second partly conical surfaces 36). The fourth angle $\alpha_4$ consequently corresponds to the difference between the first angle $\alpha_1$ and second angle $\alpha_2$, only positive angles being considered in each case. As the second angle $\alpha_2$ is preferably greater than 0°, $\alpha_4 \leq \alpha_1$ therefore applies in principle.

A geometric relation between the above-named angles, which is additionally essential to the tool 10, is: $\alpha_1 > \alpha_3 \geq \alpha_2$. In other words, the angle $\alpha_3$ at which the first bearing surfaces 40 are inclined relative to the orthogonal plane is therefore smaller than the inclination of the first partly conical surfaces 30 arranged on the top side 28 of the holder head 24, but larger than or of same size as the inclination of the second partly conical surfaces 36 arranged on the underside or end side 34 of the holder head 24.

The third angle $\alpha_3$ should only deviate slightly from the second angle $\alpha_2$ in order to be able to maintain the geometric characteristics of the tool 10. It is consequently preferred for the difference between the third angle $\alpha_3$ and the second angle $\alpha_2$ to be smaller than 6°. It is particularly preferred for the third angle $\alpha_3$ to be of same size as the second angle $\alpha_2$.

As can additionally be seen in FIG. 4, the first cutting plates 14 each comprise a first main cutting edge 44 and a second main cutting edge 46. A radius 48, which connects the two main cutting edges 44, 46 together, is provided on the outermost end of the first cutting plates 14 when viewed in the radial direction of the tool 10. Said radius 48 also functions as a blade which machines the profile bottom when the milling tool 10 is used.

Figure 7A:
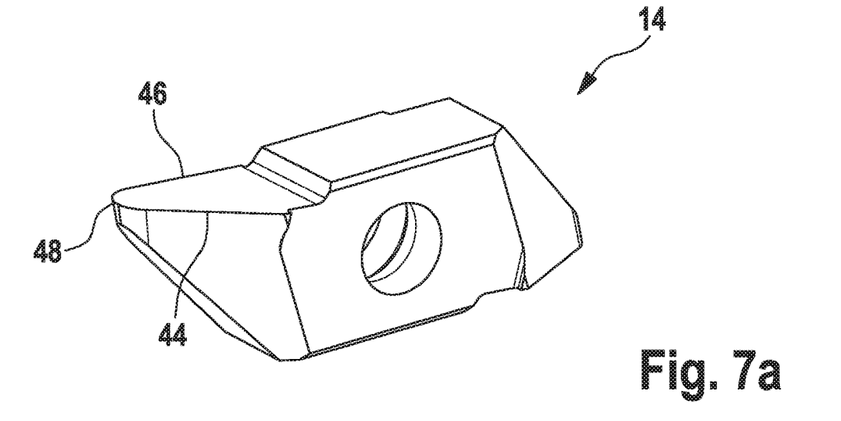
FIGS. 7a-7c show three different views of an exemplary embodiment of a first cutting plate which is usable in the milling tool.
Figure 7B:
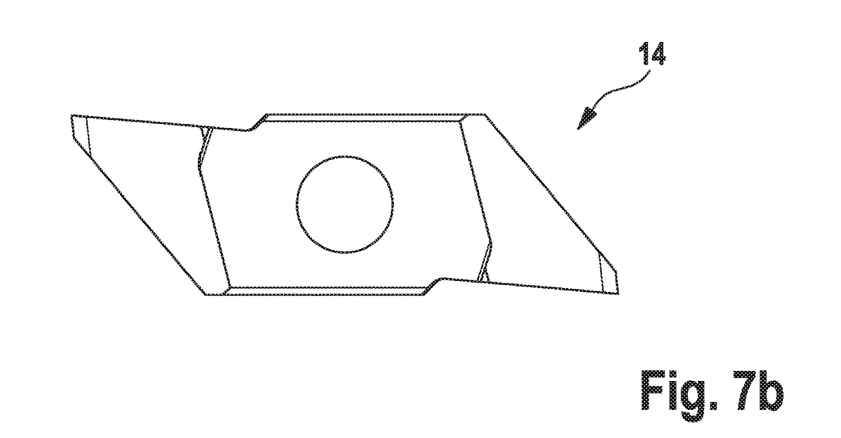
Figure 7C:
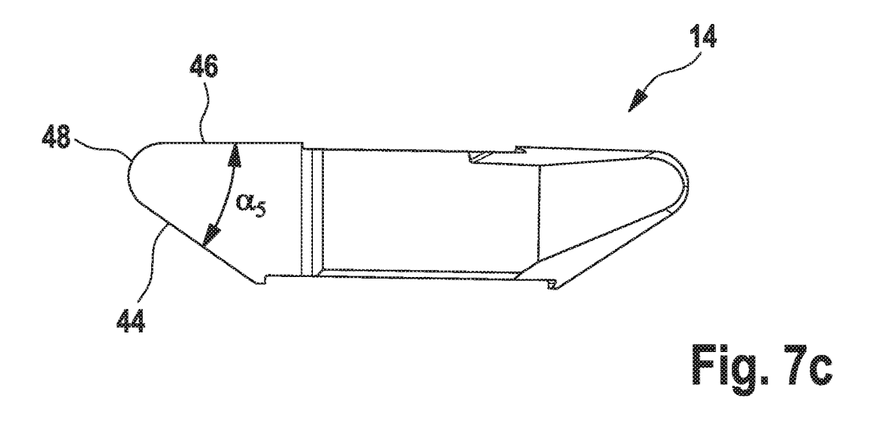
Figure 8A:
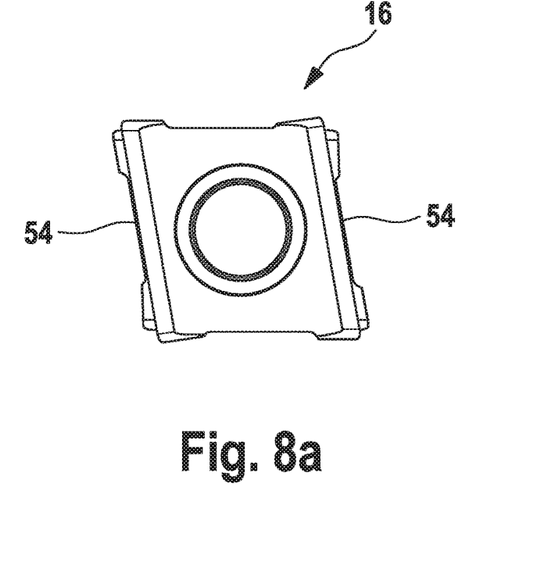
FIGS. 8a-8b show two views of a second cutting insert which is usable in the milling tool.
Figure 8B:
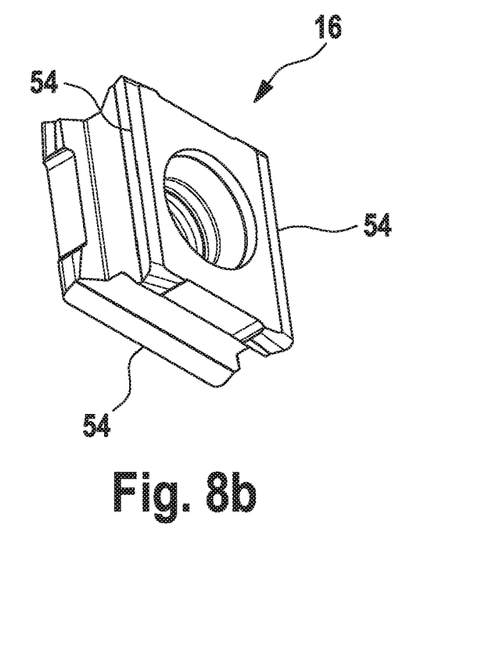
Figure 9A:
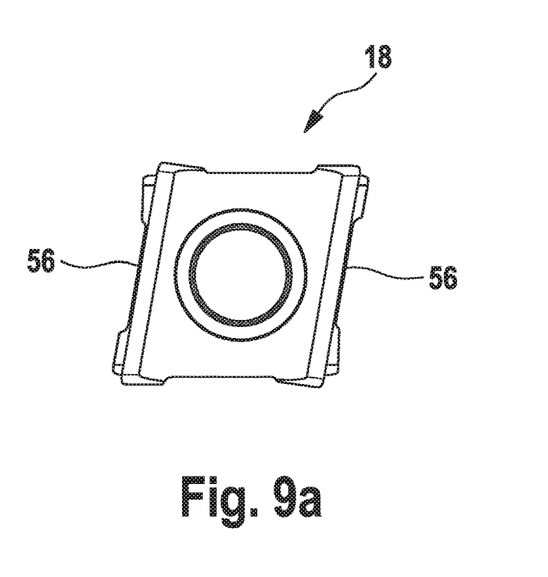
FIGS. 9a-9b show two views of a third cutting insert which is usable in the milling tool.
Figure 9B:
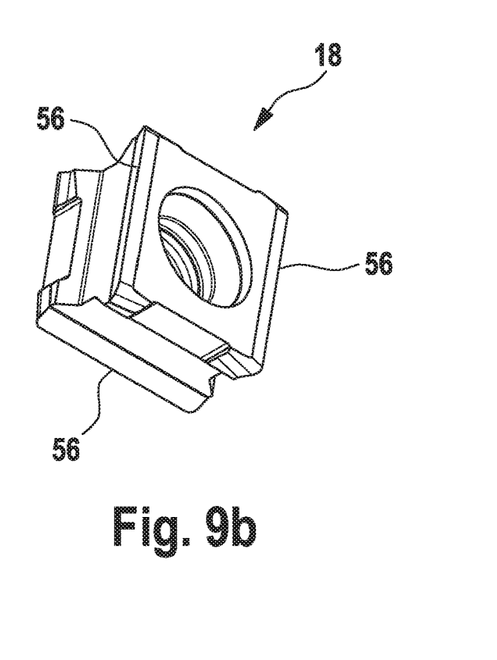

An exemplary embodiment of the first cutting plates 14 is shown in detail in three different views in FIGS. 7a-7c. The first cutting plates 14 are preferably so-called twin-bladed cutters which can be fastened in two different positions on the holder 12. When one cutting edge wears, the cutting plate 14 can consequently be turned at least once.

The fifth angle $\alpha_5$ (see FIGS. 4 and 7c) designates the angle which the first and second main cutting edges 44, 46 of the first cutting plates 14 enclose together. Said fifth angle $\alpha_5$ is preferably greater than or of same size as the fourth angle $\alpha_4$. Insofar as the fifth angle $\alpha_5$ is of same size as the fourth angle $\alpha_4$, the first main cutting edges 44 run parallel to the surface line of the first envelope cone (of the first partly conical surfaces 30). The second main cutting edges 46 then also run parallel to the surface line of the second envelope cone (of the second partly conical surfaces 36).

The sixth angle $\alpha_6$ (see FIG. 4) designates the angle which the first main cutting edges 44 enclose with the orthogonal plane. The sixth angle $\alpha_6$ is preferably of same size as the first angle $\alpha_1$.

The seventh angle $\alpha_7$ (see FIG. 4) designates the angle which the second main cutting edges 46 enclose with the orthogonal plane. The seventh angle $\alpha_7$ is preferably of same size as the second angle $\alpha_2$.

On account of the first and second partly conical surfaces 30, 36 arranged on the holder head 24 and of the inclined position of the first bearing surfaces 40 and of the above-described angular relations which exist between said surfaces, the first cutting plates 14 are able to project outward radially at some distance without collisions occurring between the workpiece and the holder 12 during milling, in particular during the production of cyclo-palloid toothings. Consequently, it is possible to mill to the full depth of the toothing profile directly during the first machining operation. This results in an enormous time saving.

In order to increase the machining quality and machining speed, in addition to the first cutting plates 14 further cutting plates 16 and 18 can be used with the tool 10, as is the case in the exemplary embodiment shown here.

The second and third cutting plates 16 and 18 differ geometrically to the first cutting plates 14. The second cutting plates 16 are preferably designed as a mirror image with respect to the third cutting plates 18. These are therefore left and right cutting plates.

An exemplary embodiment of the second and third cutting plates 16, 18 is shown in detail in each case in a perspective view and a top view in FIGS. 8a, 8b and 9a, 9b. As can be seen from the top views shown in FIGS. 8a and 9a, the second and third cutting plates 16, 18 comprise a substantially rhombic form in top view. The second and third cutting plates 16, 18 are preferably realized as indexable inserts with four identical cutting edges 54 or 56 such that they are usable in four different positions in the holder. The cutting edges 54 of the second cutting plates 16 are designated in the present case as third main cutting edges and the cutting edges 56 of the third cutting plates 18 are designated in the present case as fourth main cutting edges. Details on said type of indexable inserts are to be found in DE 10 2012 108 752 B3.

As can be seen in particular from a comparison between FIG. 1 and FIG. 2, the first and second cutting plates in the case of the exemplary embodiment shown of the tool 10 are screw-connected to the holder 12 from the end side 34 of the holder head 24. The third cutting plates, in contrast, are screw-connected to the holder 12 from the top side 28 of the holder head 24.

As already mentioned, a third cutting plate 18 is arranged on the holder 12 in each case between a first cutting plate 14 and a second cutting plate 16 when viewed in the circumferential direction. The second cutting plates 16 are fastened in each case in a second cutting plate receptacles 50 (see FIG. 3) provided on the underside of the holder head 24. The third cutting plates 18 are fastened in each case in a third cutting plate receptacles 52 arranged on the top side 28 of the holder head 24.

The arrangement of the second and third cutting plates 16, 18 is effected preferably in such a manner that the third main cutting edges 54 used of the second cutting plates 16 are moved during the rotation of the milling tool 10 about the center axis 26 along a common envelope curve which lies on the second imaginary envelope cone on which the second partly conical surfaces 36 also lie. It is equally preferred for the fourth main cutting edges 56 used of the third cutting plates 18 to be moved during the rotation of the milling tool 10 about the center axis 26 along an envelope curve which lies on the first imaginary envelope cone on which the first partly conical surfaces 30 also lie. To this end, the second cutting plates 16 are arranged in such a manner on the holder 12 that the third main cutting edges 54 used enclose an eighth angle $\alpha_8$ with the orthogonal plane (see FIG. 6) which is of same size as the second angle $\alpha_2$. Said eighth angle $\alpha_8$ is preferably also of same size as the seventh angle $\alpha_7$. In a similar manner, the third cutting plates 18 are arranged in such a manner on the holder 12 that the fourth main cutting edges 56 used enclose a ninth angle $\alpha_9$ with the orthogonal plane (see FIG. 5) which is of same size as the first angle $\alpha_1$. The ninth angle $\alpha_9$ is preferably also of same size as the sixth angle $\alpha_6$.

An arrangement realized in the above-described manner of the first, second and third cutting plates 14, 16, 18 makes it possible to machine one of the two flanks of a cyclo-palloid toothing with the first and fourth main cutting edges 44, 56 and the opposite flanks of the toothing in each case with the second and third main cutting edges 46, 54. The first cutting plates 14, in this case, mill in each case the tooth bottom and the lower two parts of the opposite tooth flanks. The second and third cutting plates 16, 18 mill the upper parts of the opposite tooth flanks of the toothing connecting thereto.

The milling tool 10 offers the possibility of producing a cyclo-palloid toothing by means of milling in a comparably economic manner with comparably high quality. In particular, it is possible, in this case, to mill the entire profile of the cyclo-palloid toothing with one and the same tool. In principle, other palloid toothings are able to be produced using the tool 10. In practice, the tool is simply used for rough machining and the workpiece is then re-worked using a finishing tool. The above-described geometry characteristics of the milling tool 10 make it possible to deliver the tool to the full profile depth as early as at the first cut without unwanted collisions occurring. The optional use of the second and third cutting plates enables optimum cut distribution, as a result of which higher feed rates are possible.

Finally, it must be pointed out that, in principle, cutting plates designed in a manner other than the ones shown here can be used without departing from the spirit and scope of the present disclosure.

What is claimed is:
1. A milling tool for machining a workpiece, comprising:
a holder which is rotated about a center axis when the milling tool is used, wherein the holder comprises in a region of its rear end a clamping portion for clamping the holder and comprises in a region of its rear end a holder head which projects out radially compared to the clamping portion, wherein the holder head comprises multiple first, second and third cutting plate receptacles, which are arranged distributed in a circumferential direction of the holder, wherein each of the second cutting plate receptacles is arranged between one of the first cutting plate receptacles and one of the third cutting plate receptacles,
multiple first cutting plates, each of which are fastened in one of the first cutting plate receptacles, wherein the first cutting plates project radially outward beyond the holder head, wherein radially outermost points of the first cutting plates lie on a common circle, wherein a center point of said common circle lies on the center axis of the holder,
multiple second cutting plates, each of which are fastened in one of the second cutting plate receptacles, wherein the second cutting plates differ from the first cutting plates,
multiple third cutting plates, each of which are fastened in one of the third cutting plate receptacles, wherein the third cutting plates differ from the first cutting plates,
wherein multiple first partly conical surfaces, which lie on a common, imaginary first envelope cone, are provided on a top side of the holder head, said top side facing the clamping portion, wherein an imaginary tip of the imaginary first envelope cone lies on the center axis of the holder and a surface line of the imaginary first envelope cone encloses a first angle $\alpha_1$ with an orthogonal plane, which is aligned orthogonally to the center axis of the holder,
wherein multiple second partly conical surfaces, which lie on a common, imaginary second envelope cone, are provided on an end side of the holder head, said end side being remote from the clamping portion and arranged opposite the top side, wherein an imaginary tip of the imaginary second envelope cone lies on the center axis of the holder and a surface line of the imaginary second envelope cone encloses a second angle $\alpha_2$ with the orthogonal plane,
wherein each of the first cutting plate receptacles has a first bearing surface, wherein each of the first cutting plates abuts against one of the first bearing sur-faces, wherein the first bearing surfaces are arranged between the top side and the end side of the holder head and each enclose a third angle $\alpha_3$ with the orthogonal plane,
wherein the surface line of the imaginary first envelope cone encloses a fourth angle $\alpha_4$ with the surface line of the imaginary second envelope cone, and
wherein the following applies: (i) $\alpha_1 > \alpha_3 > \alpha_2$ and (ii) $\alpha_4 < \alpha_1$.

2. The milling tool as claimed in claim 1, wherein a difference between the third angle $\alpha_3$ and the second angle $\alpha_2$ is less than 6°.

3. The milling tool as claimed in claim 1, wherein the third angle $\alpha_3$ is of same size as the second angle $\alpha_2$.

4. The milling tool as claimed claim 1, wherein each of the first cutting plates comprises a first main cutting edge and a second main cutting edge, which enclose a fifth angle $\alpha_5$ between each other, wherein the following applies: $\alpha_5 > \alpha_4$.

5. The milling tool as claimed in claim 1, wherein each of the first cutting plates comprises a first main cutting edge and a second main cutting edge, which enclose a fifth angle $\alpha_5$ between each other, wherein the fifth angle $\alpha_5$ is of same size as the fourth angle $\alpha_4$.

6. The milling tool as claimed in claim 5, wherein each of the first main cutting edges enclose a sixth angle $\alpha_6$ with the orthogonal plane, wherein the sixth angle $\alpha_6$ is of same size as the first angle $\alpha_1$, and wherein each of the second main cutting edges enclose a seventh angle $\alpha_7$ with the orthogonal plane, wherein the seventh angle $\alpha_7$ is of same size as the second angle $\alpha_2$.

7. The milling tool as claimed in claim 1, wherein the second cutting plates are geometrically mirror-inverted compared to the third cutting plates.

8. The milling tool as claimed in claim 1, wherein the first and the second cutting plates are screw-connected to the holder from the end side of the holder head, and wherein the third cutting plates are screw-connected to the holder from the top side of the holder head.

9. The milling tool as claimed in claim 1, wherein each of the second cutting plates comprises a third main cutting edge which encloses an eighth angle $\alpha_8$ with the orthogonal plane, wherein the eighth angle $\alpha_8$ is of same size as the second angle $\alpha_2$, and wherein each of the third cutting plates comprises a fourth main cutting edge which encloses a ninth angle $\alpha_9$ with the orthogonal plane, wherein the ninth angle $\alpha_9$ is of same size as the first angle $\alpha_1$.

10. The milling tool as claimed in claim 1, wherein each of the first cutting plates comprises a first main cutting edge and a second main cutting edge, which enclose a fifth angle $\alpha_5$ between each other, wherein the fifth angle $\alpha_5$ is of same size as the fourth angle $\alpha_4$, wherein each of the first main cutting edges enclose a sixth angle $\alpha_6$ with the orthogonal plane, wherein the sixth angle $\alpha_6$ is of same size as the first angle $\alpha_1$, and wherein each of the second main cutting edges enclose a seventh angle $\alpha_7$ with the orthogonal plane, wherein the seventh angle $\alpha_7$ is of same size as the second angle $\alpha_2$, wherein each of the second cutting plates comprises a third main cutting edge which encloses an eighth angle $\alpha_8$ with the orthogonal plane, wherein the eighth angle $\alpha_8$ is of same size as the second angle $\alpha_2$, and wherein each of the third cutting plates comprises a fourth main cutting edge which encloses a ninth angle $\alpha_9$ with the orthogonal plane, wherein the ninth angle $\alpha_9$ is of same size as the first angle $\alpha_1$, and wherein the eighth angle $\alpha_8$ is of same size as the seventh angle $\alpha_7$, and wherein the ninth angle $\alpha_9$ is of same size as the sixth angle $\alpha_6$.

11. The milling tool as claimed in claim 1, wherein each of the first cutting plates are fastened to the holder by means of a screw, wherein each of the screws engages in a thread, which is provided in the holder head orthogonally to the first bearing sur-faces.

12. The milling tool as claimed in claim 1, wherein the holder is made at least in part from steel and the first cutting plates are made at least in part from hard metal.

13. The milling tool as claimed in claim 1, wherein the milling tool is suitable for producing a cyclo-palloid toothing.

\* \* \* \* \*